April 1, 1930. J. Q. ADAMS 1,752,829
TIRE VULCANIZER
Filed Aug. 30, 1928 2 Sheets-Sheet 2

Inventor
John Q. Adams
By W. S. McDowell
Attorney

Patented Apr. 1, 1930

1,752,829

UNITED STATES PATENT OFFICE

JOHN Q. ADAMS, OF COLUMBUS, OHIO, ASSIGNOR TO THE ADAMS-BARRE COMPANY, OF COLUMBUS, OHIO, A CORPORATION OF OHIO

TIRE VULCANIZER

Application filed August 30, 1928. Serial No. 303,048.

This invention relates to improvements in tire vulcanizers, and has for its primary object the provision of a vulcanizer of simplified and improved construction and adapted particularly to effect the curing or vulcanizing of vehicle tires of the high pressure or the so-called balloon or any other type of tires which may be used on pleasure or commercial vehicles, and wherein provision is made for adapting the vulcanizer to the various sizes and forms of such tires without any major change in the construction or operation of the vulcanizer.

It is another object of the invention to provide a tire vulcanizer which consists of a hollow, segmental master mold through which heat in the form of steam or superheated steam is circulated in order that the walls of the mold section may be heated to a degree necessary to effect the curing or vulcanizing of rubber or rubber containing bodies, such as motor vehicle tires, and wherein the construction of the master mold is such as to permit of the application thereto of a plurality of readily removable shell sections which adapt the mold to tires of varying sizes and proportions, permitting such tires or tire cases to be placed over the mold or the shell sections and securely fastened thereto so that the heat of the steam circulating through the master mold section may be imparted to such tires to effect their proper curing.

It is a further object of the invention to shape the master mold and the removable shell sections to conform with the curvature substantially of a motor vehicle tire casing and, further, to longitudinally and gradually taper the mold and shell sections so that the latter will be frictionally held and locked on the master mold section for the purpose of preventing accidental displacement of the tire and to secure good heat transfer or conductivity.

With these and other objects in view which will be apparent as the description proceeds, the invention consists in the novel features of construction, combinations of elements and arrangements of parts hereinafter to be fully described and pointed out in the appended claims.

Figure 1:
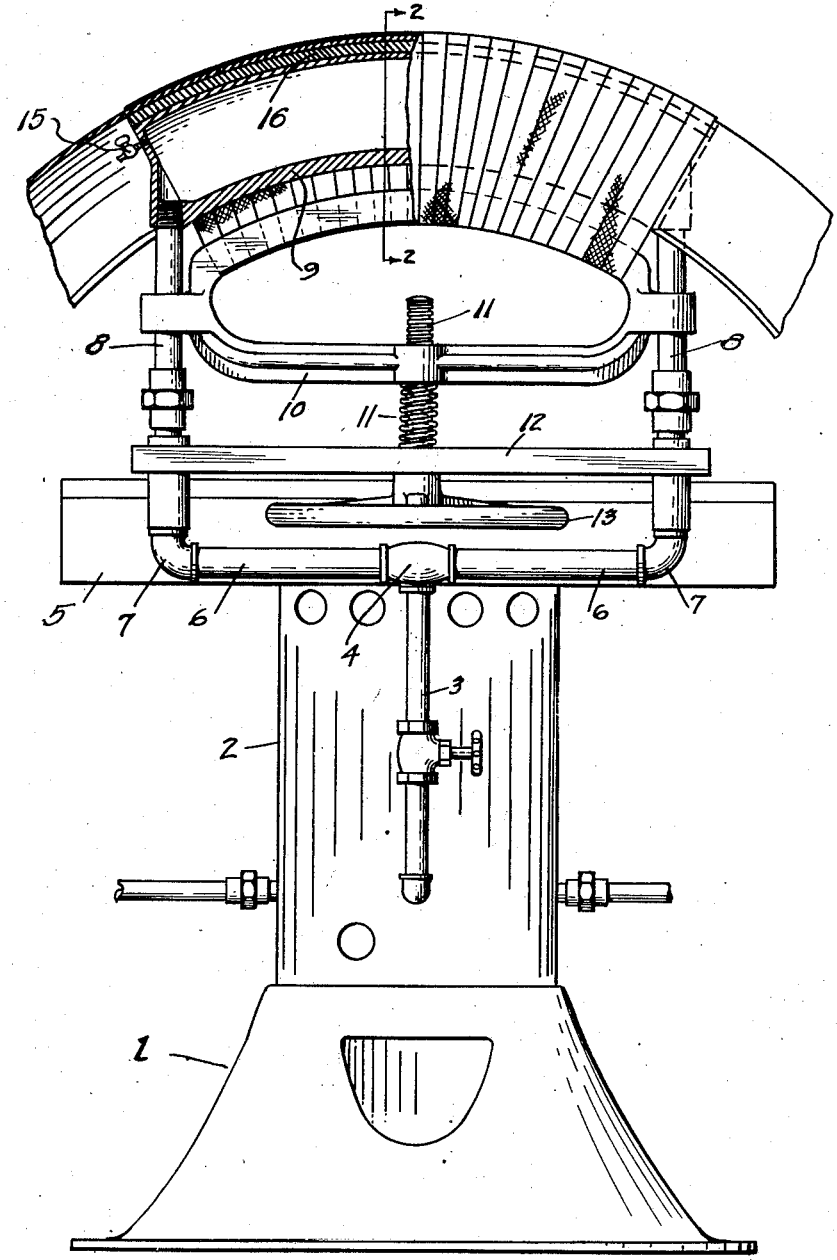
Figure 2:
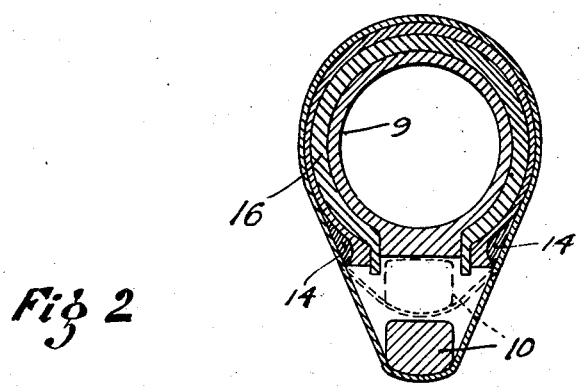
Figures 3, 4:
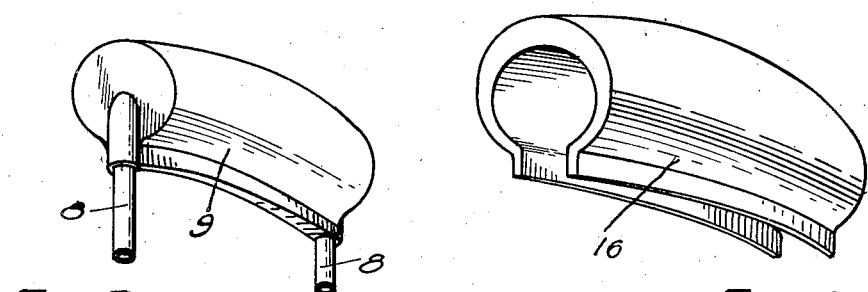
Figure 5:
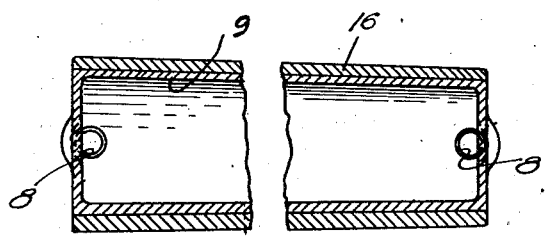

In the accompanying drawings:

Figure 1 is a view in front elevation of a tire vulcanizing or curing mechanism comprising the present invention, a portion of such mechanism being shown in vertical section, Figure 2 is a transverse vertical sectional view taken on the plane indicated by the line 2—2 of Figure 1, Figure 3 is a perspective view of the master mold, Figure 4 is a perspective view of one of the removable shell sections, Figure 5 is a horizontal sectional view taken through the mold section.

Referring more particularly to the drawings, the numeral 1 designates the base of the vulcanizer, the pedestal 2 of which is formed to include a steam generator of the usual type. Leading from the outlet side of the steam generator is a valve controlled pipe line 3 which extends to a pipe coupling 4 suitably supported in connection with a frame 5.

Leading from opposite sides of the coupling 4 are pipes 6, which terminate in elbows 7 from which extend upwardly directed vertical steam supply pipes 8. The upper ends of these pipes are connected with the opposite ends of an arcuate, hollow master mold section 9, which, preferably, is formed from cast aluminum or other suitable metal. The lower section 9 partake generally of the configuration of a tire casing of the type used in connection with motor vehicles and, preferably, the mold section 9 possesses proportions adapted to a standard but small size balloon or other type of tire commonly known on the market, the mold section 9 conforming to the inner diameter of a tire casing of this type.

In operation the tire casing is applied to the hollow master mold section by being inserted over the same. The casing is then secured solidly or firmly to the mold section by wrapping the outer portion of the tire casing tightly and firmly with a heavy cloth tape, which tape also passes through a tightening frame 10, which is slidably carried by the vertical pipes 8. The frame 10 is adjusted by means of a firmly disposed screw 11, which has its upper end threaded into frame 10, while the lower portion of the screw is rotatably journalled in connection with a transversely extending bar 12 which forms a part of the main supporting frame 5. It will be seen that after the tire casing has been wrapped with the tape the hand wheel 13 at the lower part of the screw is rotated so as to draw the tightening frame 10 downwardly. This movement of the frame in connection with the wrapping tape serves to securely clamp a casing on the mold section 9. A filler 14 is placed between the wrapping tape and the tire casing so that the pressure of the tape due to the downward movement of the tightening frame will firmly hold the bead portion of the tire in engagement with the mold section. Steam is then circulated through the mold section for the purpose of heating said mold section and the entire casing applied thereto, thus carrying out the complete vulcanizing or curing operation. A petcock or valve 15 may be positioned in the end wall of the master mold so that air which is entrapped in the mold can be exhausted therethrough during the circulation of steam through the mold section.

An outstanding feature of the present invention is to render the device conveniently adaptable to tire casings of varying standard sizes. There are several of such sizes and the machine can be readily changed to conform with these different sizes by employing a plurality of removable shell sections. These sections are indicated in the drawings at 16, and it will be observed that each of the same resembles a portion of a tire casing. Each section is formed from cast aluminium or some metal which possesses a high degree of thermo-conductivity. The shell sections may be readily applied to the stationary master mold section by arcuately sliding the shell section over one end and along the length of the master mold section. Both the mold section 9 and the shell sections 16 have their complemental surfaces tapered, so that when the shell section occupies its final position on the mold section it will be frictionally held in locked relationship with the mold section and positively prevented from losing accidentally such operative position.

It will be seen that when different tire sizes are encountered it is merely necessary to select a shell section which conforms with the particular tire casing. In this manner the machine is adapted to practically all standard sizes of tires with but minimum effort, labor and expense on the part of the operator.

What is claimed is:

1. A tire curing attachment comprising an arcuate hollow master mold section formed from a metal possessing high thermo-conductivity, means for introducing a heating medium into said mold section, and a removable shell section telescopically positioned over said master mold section, the inner walls of said shell and the outer walls of said mold section being so shaped that said sections physically engage one another over substantially the full area thereof.

2. A tire curing attachment comprising an arcuate hollow master mold section, means for introducing a heating medium into said mold section, and a plurality of removable shell sections of various sizes selectively positionable over said master mold section, said removable shell sections possessing an inner configuration permitting the same to telescope over said master mold section and to frictionally engage with substantially the full side wall area thereof.

3. A tire curing attachment comprising an arcuate, hollow master mold section formed from a metal possessing high thermo-conductivity, means for introducing a fluid heating medium into said mold section, and a removable shell section telescoped over and frictionally engaged with said master mold section.

4. In a machine for curing vehicle tire casings, a supporting frame, an arcuate mold section carried by said supporting frame, means for circulating a heating fluid through said mold section, said mold section possessing a contour and conforming substantially to the inner configuration of a tire casing, said mold section being of slightly tapered form from one end thereof to the other, and a removable shell section shaped to conform with the configuration of a tire casing and shaped internally to provide tapering walls corresponding with the walls of the mold section, whereby said shell section may frictionally engage with the walls of the mold section to retain such sections in applied operative relation.

In testimony whereof I affix my signature.

JOHN Q. ADAMS.